April 18, 1961     D. CRAIG     2,979,974
BORING TOOL
Filed Aug. 19, 1958     2 Sheets-Sheet 1
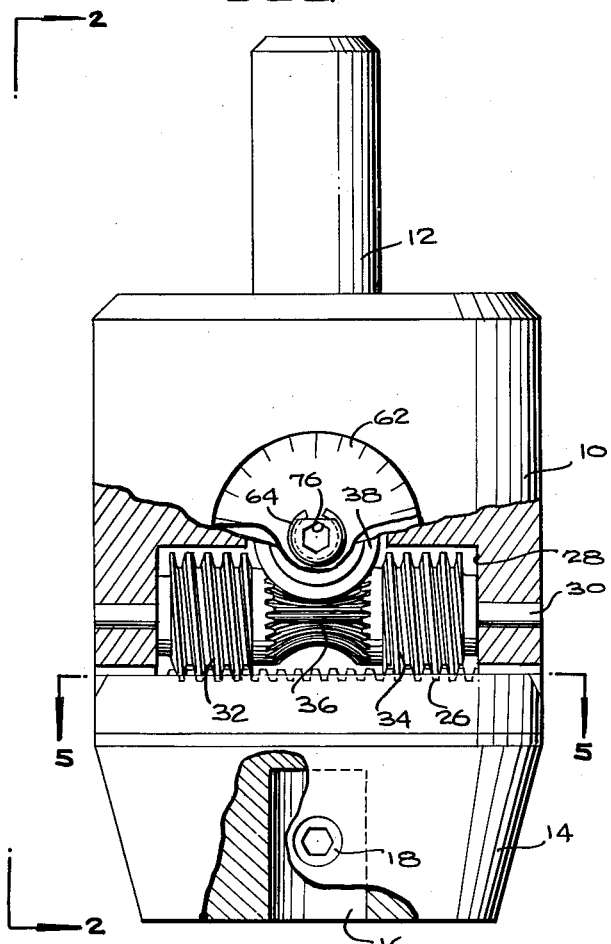
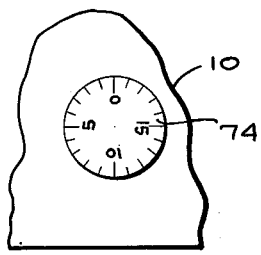
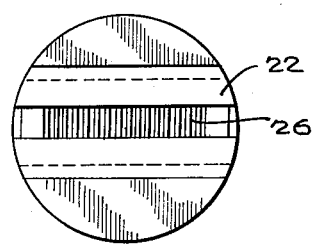
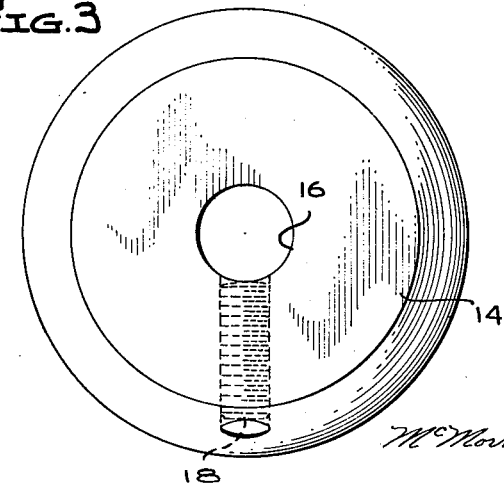
INVENTOR.
DONALD CRAIG
BY
*McMorrow, Berman + Davidson*
ATTORNEYS April 18, 1961 D. CRAIG 2,979,974
BORING TOOL
Filed Aug. 19, 1958 2 Sheets-Sheet 2
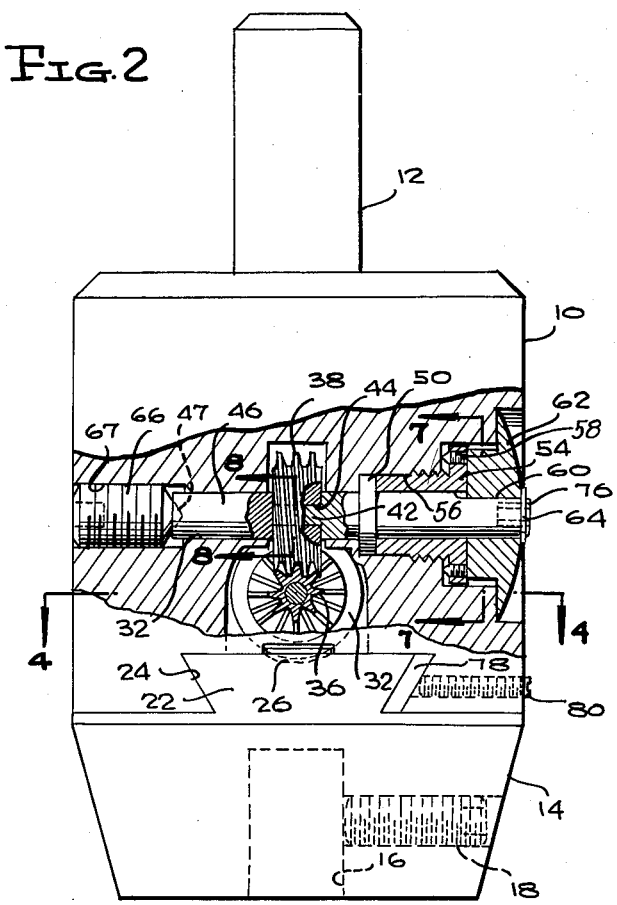
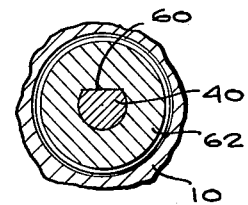
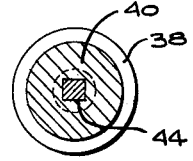
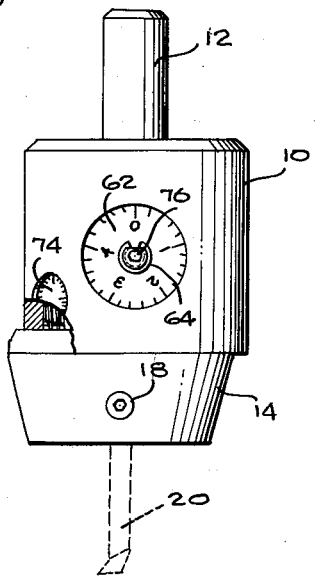
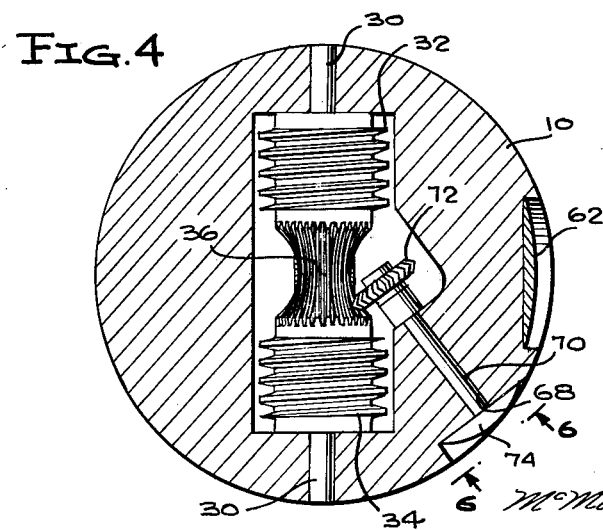
INVENTOR.
DONALD CRAIG
BY
McMorrow, Berman & Davidson
ATTORNEYS

United States Patent Office 2,979,974
Patented Apr. 18, 1961

2,979,974
BORING TOOL
Donald Craig, 113 E. 26th St., Paterson, N.J.
Filed Aug. 19, 1958, Ser. No. 755,979
1 Claim. (Cl. 77—58)

The present invention relates to boring tools.

An object of the present invention is to provide a boring tool which has means enabling the user thereof to adjust the tool to five-one hundred thousandths of an inch.

Another object of the present invention is to provide a boring tool which lends itself to ready adjustment to any preset position, enabling an operator to make successive cuts at predetermined depths on two or more work pieces.

A further object of the present invention is to provide a boring tool which is sturdy in construction, one simple in structure, one economically feasible and one which is highly effective in action.

These and other objects and advantages of the present invention will be fully apparent from the following description when taken in conjunction with the annexed drawings, in which:

Figure 1 is an elevational view with parts broken away to show the interior construction of the boring tool of the present invention;

Figure 2 is a view similar to Figure 1 taken on the line 2—2 of Figure 1;

Figure 3 is a bottom plan view;

Figure 4 is a view taken on the line 4—4 of Figure 2;

Figure 5 is a view on a reduced scale, taken on the line 5—5 of Figure 1;

Figure 6 is a fragmentary elevational view of one of the dials;

Figure 7 is a view taken on the line 7—7 of Figure 2;

Figure 8 is a view taken on the line 8—8 of Figure 2; and,

Figure 9 is a reduced elevational view with a portion broken away, showing the tool holder shifted laterally on the boring tool housing, a cutting tool being shown in dotted lines carried by the tool holder.

Referring in greater detail to the drawings in which like numerals indicate like parts throughout the several views, the boring tool of the present invention is intended for use on boring machines, drill presses, milling machines, and the like. The tool comprises a housing 10 having a shank 12 projecting from one end of the housing 10 for engagement in a chuck of a metal working machine, such as a boring machine, drill press or the like. A tool carrier 14 is mounted on the housing 10 at the end opposite to the shank 12 for reciprocable back and forth movement across the bottom of the housing 10.

The tool carrier 14 is provided with an upwardly extending socket 16 and a transversely arranged set screw 18 threadedly mounted in the tool carrier 14 for engaging a cutting tool, as shown in dotted lines in Figure 9 and designated by the reference numeral 20. The upper face of the tool holder 14 is provided with a dove-tailed tongue 22 slidably mounted in a slideway 24 provided in the underface of the housing 10. Intermediate the side edges of the tongue 22 is a rack 26 extending from a point inwardly of each end of the tongue 22.

Longitudinally of the slideway 24 within the housing 10 is a recess 28, the ends of which are spaced from the exterior walls of the housing 10. A driven shaft 30 has its end portions journalled in the parts of the housing 10 at the ends of the recess 28. A pair of worms 32 and 34, spaced from each other, are fixedly secured to the driven shaft 30. The space between the worms 32 and 34 on the shaft 30 is undercut to form a pinion 36 conformably shaped to fit a portion of the periphery of a second worm 38 connected to a drive shaft 40 journalled in the housing 10. The drive shaft 40 has a square extension 42 extending into a complementally shaped hole 44 in the worm 38, drivingly connecting the shaft 40 to the worm 38. A bushing 46 is positioned on the side of the worm 38 remote from the drive shaft 40 and bears against the side of the worm 38. The drive shaft 40 carries a collar 50 intermediate the ends thereof which bears against a shoulder provided in the bore 52 provided in the housing 10 for the shaft 40. A bushing 54 is threadedly mounted in the counterbore 56 and surrounds a portion of the shaft 40 exteriorly of the collar 50. A pair of set screws 58 are threadedly engaged in bores provided in the outer portion of the bushing 54 and serve to lock the bushing 54 in any position of its adjusted inward and outward movement of the counterbore 56. The shaft 40 is provided on its exterior end portion with a flat 60. A dial 62 is conformably shaped to fit over the end portion of the shaft 40 and a snap ring 64 is seated in a groove in the end portion of the shaft 40 adjacent the flat end portion of the shaft 40, securing the dial 62 to the shaft 40.

The end of the bushing 46 remote from the worm 38 is provided with a recess 47 receiving the pointed end of a set screw 66 threaded in a counterbore 67 in the housing 10 and constituting a means for adjusting the bushing 46 in its abutting relation position with respect to the worm 38.

In Figure 4 it will be seen that the housing 10 is provided with still another bore 68 in which is journalled a shaft 70 carrying a pinion 72 on one end and a dial 74 on the other end. The dial 74, as is the dial 62, is exteriorly of the housing 10. The pinion 72 is in mesh with the teeth of the pinion 36 at a point remote from the meshing engagement of the worm 38 with the pinion 36.

The center of the shaft 40 is provided with a socket 76 conformably shaped to receive a wrench head for manually turning the shaft 40. The socket 76 constitutes manually actuable means operatively connected to the shaft 40 for effecting the rotation of the same.

A wedge or key 78 extends along one side of the slideway 24 and is adjustably positioned by means of a set screw 80 for taking up any loose play due to wear between the tongue 22 and the slideway 24.

In use, with the shank 12 engaging a rotating member for rotating the housing 10 and a cutting tool or bit 20 secured in the socket 16 by the set screw 18, the tool holder 14 may be adjusted for depth of cut of the cutting tool or bit 20 by means of a wrench inserted in the dial socket 76 and dial 62 manually turned in either direction. This effects the rotation of the shaft 40 and results in the rotation of the worm 38, pinion 36, worms 32 and 34, and lateral movement of the rack 26 carrying with it a tool holder 14. The calibrations of the first and second dials 62 and 74, and the number of teeth on the worm 38, the number of teeth on the pinion 36, the number of teeth on the worms 32 and 34, and the number of teeth on the pinion 72 are such that the first dial will indicate fractional parts of individual revolutions of the shaft 30 and the second dial 74 will indicate the multiple parts of a single revolution of the shaft 30.

The number of teeth on the pinions 36 and 72 and on the worms 32 and 34, and on the worm 38 may be varied as desired to produce the resultant movement of the tool holder 14 on the housing 10 in accordance with the calibrations on the dials 62 and 74. The number of teeth on such pinions, worms, and rack need not here be set forth as such selection of the teeth and calibrations of the dials is conventional and will vary with the construction of the tool.

The worms 32 and 34 and the pinion 36 are formed integrally of a single piece of stock although they may be formed separately and secured together by any suitable manner if desired. Also, it is to be understood that the gearing assembly consisting of the worms 32 and 34 and the pinion 36 may be employed for uses other than in connection with the boring tool constituting the present invention.

What is claimed is:

In a boring tool, a housing, a shank projecting from said housing for engagement by a rotating member for rotating said housing, a driven shaft rotatable in opposite directions in said housing, a pair of spaced worms on said driven shaft, a tool carrier on said housing and connected to said worms for reciprocating movement responsive to rotary movement of said shaft in opposite directions, a pinion on said driven shaft between said worms, a drive shaft rotatable in opposite directions in said housing, a worm on said drive shaft in meshing engagement with said pinion, a first dial having calibrations for indicating fractional parts of individual revolutions of said driven shaft positioned exteriorly of said housing and mounted on said drive shaft for rotation therewith, hand actuable means on said first dial for effecting the rotation of the latter, a second dial having calibrations for indicating the multiple parts of a single revolution of said driven shaft positioned exteriorly of said housing and spaced from said first dial, and means connecting said pinion to said second dial for operation of said second dial responsive to rotational movement of said pinion.

References Cited in the file of this patent

UNITED STATES PATENTS

| | | |
|---|---|---|
| 1,021,384 | Smith | Mar. 26, 1912 |
| 2,093,743 | Steiner | Sept. 21, 1937 |
| 2,438,607 | Jackson | Mar. 30, 1948 |
| 2,520,342 | Ross | Aug. 29, 1950 |
| 2,590,420 | Lagher | Mar. 25, 1952 |

FOREIGN PATENTS

| | | |
|---|---|---|
| 233,623 | Switzerland | Nov. 16, 1944 |
| 437,042 | Italy | June 22, 1948 |